United States Patent [19]

Sugino et al.

[11] Patent Number: 4,748,870
[45] Date of Patent: Jun. 7, 1988

[54] SELECT SHOCK CONTROL SYSTEM FOR AUTOMATIC TRANSMISSION

[75] Inventors: Masaru Sugino, Fujisawa; Junichi Aoki, Yokosuka, both of Japan

[73] Assignee: Nissan Motor Co., Ltd., Yokohama, Japan

[21] Appl. No.: 903,705

[22] Filed: Sep. 4, 1986

[30] Foreign Application Priority Data

Sep. 5, 1985 [JP] Japan .................................. 60-197465
Feb. 20, 1986 [JP] Japan .............................. 61-23406[U]

[51] Int. Cl.⁴ ........................ B60K 41/18; B60K 41/16
[52] U.S. Cl. ........................................... 74/866; 74/867
[58] Field of Search .................................. 74/866, 867

[56] References Cited

U.S. PATENT DOCUMENTS

| | | | |
|---|---|---|---|
| 3,324,738 | 12/1964 | Olsen et al. ............................ | 74/472 |
| 3,871,250 | 3/1975 | Miyauchi et al. ................. | 74/867 X |
| 4,274,308 | 6/1981 | Iwanaga et al. ................... | 74/867 X |
| 4,584,906 | 4/1986 | Nagaoka et al. ...................... | 74/866 |
| 4,611,507 | 9/1986 | Burkel et al. .......................... | 74/866 |
| 4,616,531 | 10/1986 | Ogasawara et al. .................. | 74/866 |
| 4,631,982 | 12/1986 | Miki et al. ......................... | 74/866 X |
| 4,658,676 | 4/1987 | Furusawa et al. .................... | 74/866 |

*Primary Examiner*—Dirk Wright
*Attorney, Agent, or Firm*—Foley & Lardner, Schwartz, Jeffery, Schwaab, Mack, Blumenthal & Evans

[57] ABSTRACT

A control system is proposed that electro-hydraulically develops a servo actuating fluid pressure that momentarily drops to prevent an increase in frictional transmission torque of a friction element which otherwise would be caused by an increase in dynamic frictional coefficient between a driving and a driven member of the friction element as the relative rotation of them decreases toward zero.

15 Claims, 9 Drawing Sheets

SELECT SHOCK CONTROL SYSTEM FOR AUTOMATIC TRANSMISSION

BACKGROUND OF THE INVENTION

The present invention relates to a control system for an automatic vehicle transmission.

Recently, it is required that automatic vehicle transmissions have some measure to alleviate select shock caused by engagement of a certain friction element or elements upon selecting a forward drive or a reverse drive from the neutral condition of the transmission. Conventionally, in order to control the rise of a servo actuating fluid pressure supplied to a friction element to be engaged, an accumulator has been used. The accumulator has an expandable chamber communicating with the servo chamber of the friction element. The expandable chamber is defined by a piston biased by a spring. The spring yields to allow movement of the piston in such a direction as to expand the volume of the expandable chamber after the chamber has begun to be supplied with fluid pressure, thus allowing gradual fluid pressure build-up within the friction element. Thus, the friction element is gradually engaged to alleviate select shock. As is known, the rate of increase in fluid pressure is mainly dependent on a load-flexure characteristic of the piston spring, and the rate of increase of the fluid pressure must be set as small as possible for increased effectiveness of select shock alleviation. However, if the rate of increase of the fluid pressure is decreased, the completion timing of the select operation is delayed, resulting in poor operability of the vehicle.

SUMMARY OF THE INVENTION

A control system is therefore proposed that electrohydraulically develops a servo actuating fluid pressure that momentarily drops to prevent an increase in frictional transmission torque of a friction element which otherwise would be caused by an increase in dynamic frictional coefficient between a driving and a driven members of the friction element as the relative rotation of them decreases toward zero.

DETAILED DESCRIPTION OF THE INVENTION

Before entering into the description of various embodiments according to the present invention, a mechanism how a select shock occurs will be hereinafter explained along with FIGS. 1 to 3.

Figure 1:
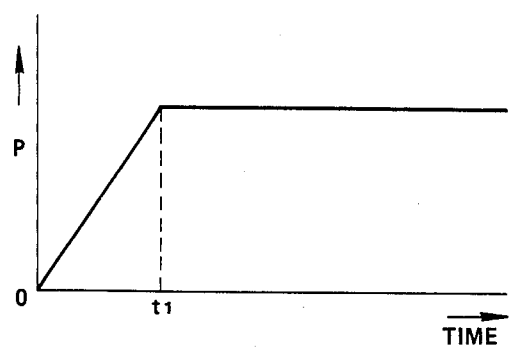
FIG. 1 shows the variation of servo actuating fluid pressure P against time in the process of engaging a friction element.

FIG. 1 shows the variation of servo actuating fluid pressure supplied to a friction element, i.e., a forward clutch, to be engaged after a manual valve has been shifted to a D (Drive) range from a N (Neutral) range. As will be appreciated, the servo actuating fluid pressure P supplied to the friction element increases with a rise time $t_1$. FIG. 2 shows the variation of relative rotational speed V between a driving member and a driven member of the friction element against time in the engagement process. As will be appreciated from FIG. 2, the relative rotational speed V decreases as shown and becomes zero at the instant $t_e$ when the select operation is completed. FIG. 3 shows the variation of dynamic frictional coefficient $\mu$(mu) against the relative rotational speed V between the driving and drive members of the friction element (a $\mu-V$ characteristic). As will be appreciated from this Figure, the dynamic frictional coefficient (mu) tends to increase as the relative rotational speed V becomes small and approaches zero. This causes the occurrence of a great peak of output shaft torque near the completion of the select operation. This peak is felt as substantial shocks called as "a select shock."

First embodiment is described hereinafter along with FIGS. 4 to 7.

Figure 4:
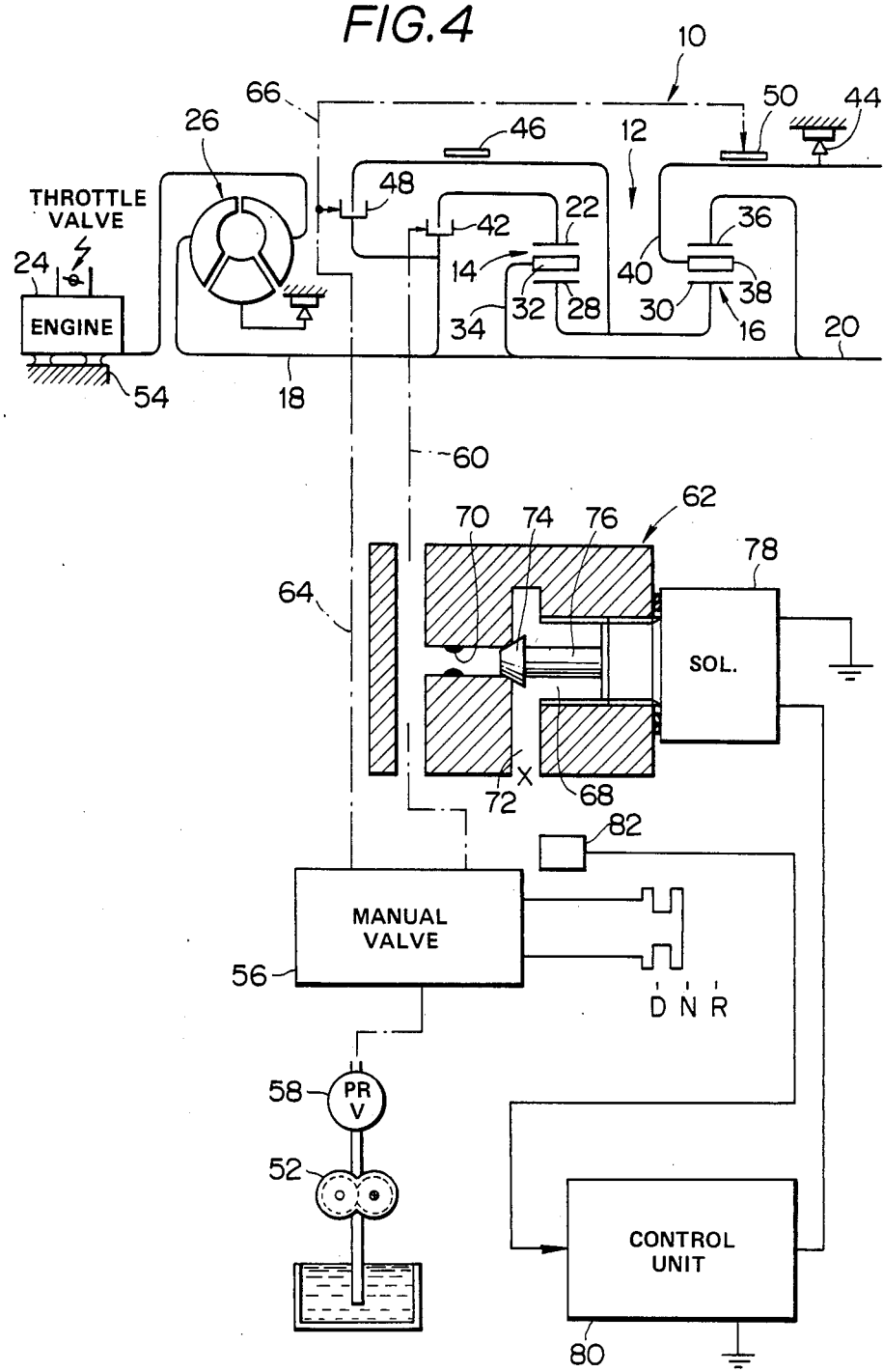
FIG. 4 illustrates schematically a first embodiment of a control system according to the present invention.

FIG. 4 shows a vehicle automatic transmission 10 including a planetary gear system 12. The planetary gear system 12 includes a front planetary gear set 14 and a rear planetary gear set 16, and it can provide various drive connections between a transmission input shaft 18 and a transmission output shaft 20. A ring gear 22 of the front planetary gear set 14 and the transmission input shaft 18 receive engine torque from an engine 24 via a torque converter 26, for example. Sun gears 28, 30 of the front and rear planetary gear sets 14, 16 are drivingly connected to each other for rotation as a unit. Disposed between the ring and sun gears 22, 28 of the front planetary gear set 14 and meshing them are planet pinions 32. A carrier 34 rotatably carrying these pinions 32 is drivingly connected to the transmission output shaft 20. A ring gear 36 of the rear planetary gear set 16 is drivingly connected to the carrier 34 and thus connected to the transmission output shaft 20. Disposed between the ring and sun gears 36, 30 of the rear planetary gear set 16 and meshing them are planet pinions 38 rotatably carried by a carrier 40.

FIG. 4 also shows friction elements including a hydraulically operated forward clutch 42, i.e., a rear clutch, which is kept engaged for forward drive, but is released otherwise to interrupt driving connection between the transmission input shaft 18 and the front ring gear 22, and a one-way clutch 44. The one-way clutch 44 is activated to render the rear carrier 40 operable as a reaction member to produce the first forward speed ratio. Also shown is a hydraulically operated band brake 46, i.e., a second band brake, for the common sun gears 28, 30. When it is applied, the brake 46 holds the common sun gears 28, 30 stationary to produce the second forward speed ratio. This brake 46 is applied when servo actuating hydraulic fluid pressure is supplied to a servo apply chamber thereof, but released when the servo actuating fluid pressure is also supplied to a servo release chamber thereof. A hydraulically operated high and reverse clutch 48, i.e., a front clutch, is engaged to produce driving connection between the transmission input shaft 18 and the common sun gears 28, 30 when servo actuating hydraulic fluid pressure is applied thereto, but released when the servo actuating fluid pressure is eliminated therefrom. An upshift from the second forward speed ratio to the third forward speed is carried out by releasing the brake 46 and applying the high and reverse clutch 48. A low-reverse band brake 50 is arranged to hold the rear carrier 40 stationary. Reverse ratio is produced when the high and reverse clutch 48 is engaged and the low-reverse brake 50 is applied with the other friction elements released.

The hydraulic fluid pressure for actuating the friction elements is derived from a pump 52 appropriately driven by the engine 24 that is installed with respect to a vehicle body 54 in a conventional manner. A fluid discharged by the pump 52 is supplied to a suitable manual valve 56. The fluid has a pressure determined by a suitable pressure regulating valve 58. This pressure is hereinafter called as a "line pressure." If the manual valve 56 is shifted from a neutral (N) range to a drive (D) range as illustrated, the fluid having the line pressure passes through a fluid line 60 to the forward clutch 42. The fluid pressure build-up within the forward clutch 42 is modulated by an electrically operated valve 62. If the manual valve 56 is shifted from the N range to a reverse (R) range, the fluid line 60 is depressurized, while the fluid having the line pressure passes through a fluid line 64 to the high and reverse clutch 48 and through a branch line 66 to the low-reverse brake 50. If the manual valve 56 is placed at the N range, the fluid is drained from the fluid lines 60 and 64.

The electrically operated valve 62 includes a control chamber 68 having a restricted inlet 70 and an exhaust 72. The restricted inlet 70 communicates with the fluid line 60 and, therefore, has supplied thereto hydraulic fluid having the line pressure determined by the pressure regulator valve 58 when the manual valve 56 is placed at the D range. The communication between the restricted inlet 70 and the exhaust 72 is controlled by a valve 74. The valve 74 has an armature 76 attached thereto and thus is either in an open or closed position with respect to the restricted inlet 70 as determined by energization of a solenoid 78. When the solenoid 78 is energized, the armature 76 is attracted to the right and, accordingly, the valve 74 so that communication is permitted between the restricted inlet 70 and the exhaust 72. This decreases the pressure of the fluid, i.e., the servo actuating fluid pressure, supplied to the forward clutch 42 through the fluid line 60. On the other hand, when the solenoid 78 is deenergized, the attractive force acting on the armature 76 is removed so that the valve 74 due to bias of a return spring built in the solenoid 78 will return to the normal closed position illustrated and the servo actuating fluid pressure in the fluid line 60 will increase.

A control unit 80 controlled by a range position sensor 82 supplies current to the solenoid 78 to operate the electrically operated valve 62. The range position sensor 82 involves an inhibitor switch mounted with respect to the manual valve 56. The inhibitor switch is used such that it turns on vehicle's reverse lamps when the manual valve 56 is placed at the R range, and it allows rotation of a vehicle's stator motor when the manual valve 56 is placed at the N range. Thus, a voltage drop will take place at the inhibitor switch when the manual valve 56 is shifted from the N range to the D range, while a voltage rise will take place at the inhibitor switch when the manual valve 56 is shifted from the N range to the R range. The inhibitor switch of this kind is employed by L4N71B type or E4N71B type automatic transmissions manufactured by Nissan Motor Company Limited. The range position sensor 82, therefore, supplies the just mentioned voltage drop, as a D range select signal, to the control unit 80, and the just mentioned voltage rise, as a R range select signal, to the control unit 80.

Figure 5:
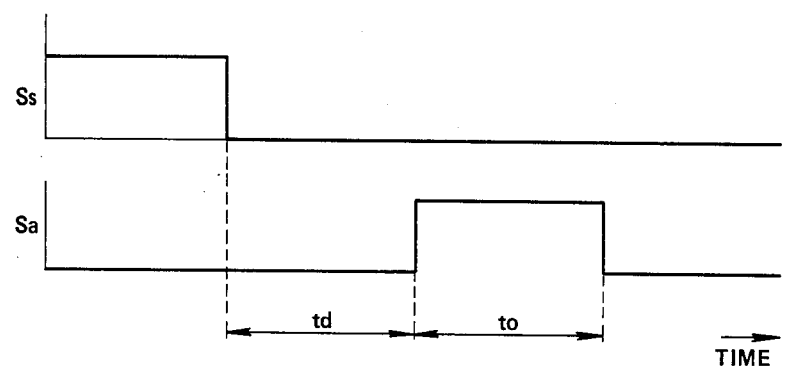
FIG. 5 is a timing diagram showing a select signal and a solenoid valve drive pulse supplied to an electrically operated valve of the control system shown in FIG. 4.

In operation, when the manual valve 56 is in the N range, there exists no fluid in the fluid line 60 and the valve 74 is in the closed position as illustrated. If the manual valve 56 is shifted from the N range to the D range, the fluid under pressure begins to pass through the fluid line 60 to the forward clutch 42. As shown by the fully drawn curve in FIG. 6, the servo actuating fluid pressure P applied to the forward clutch 42 immediately rises halfway to a value that is lower than the line pressure as indicated by the broken line and continues to assume this value until a predetermined time $t_d$ elapses after the output Ss of the sensor 82 drops as shown in FIG. 5 upon shifting of the manual valve 56 from the N range to the D range. As shown in FIG. 5, the control unit 80, on the other hand, generates a out pulse signal Sa with a predetermined voltage and a predetermined width $t_0$ after the predetermined time $t_d$ has elapsed since the sensor output Ss dropped thus producing a trigger signal. Upon receiving this pulse signal Sa, the solenoid 78 is energized to attract the armature 76 to the right and accordingly the valve 74 to the open position. This causes the communication to be established between the restricted inlet 70 and the exhaust 72 for the predetermined time $t_0$, thus causing a drop in the servo actuating fluid pressure P at a stage indicated by the reference character d in FIG. 6. The torque T transmitted by the forward clutch 42 may be expressed generally as, $$T = P \times A \times \mu \times D \tag{1}$$

where,

P: the servo actuating fluid pressure,

A: the pressure acting area on friction members of the forward clutch 42,

μ: the dynamic frictional coefficient,

D: the means diameter of the friction members.

Figure 2:
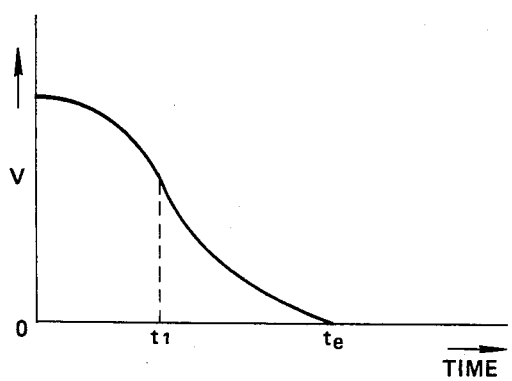
FIG. 2 shows the variation of relative rotational speed V against time in the process of engaging the friction element.
Figure 3:
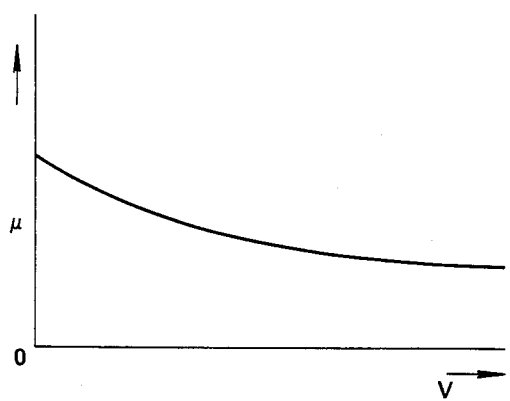
FIG. 3 shows the variation of dynamic frictional coefficient $\mu$(mu) against relative rotational speed V.
Figure 6:
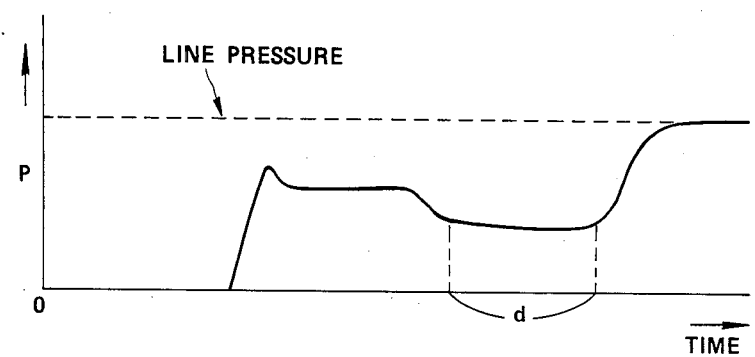
FIG. 6 shows the variation of servo actuating fluid pressure P developed by modulation by the electrically operated valve of the control system shown in FIG. 4.
Figure 7:
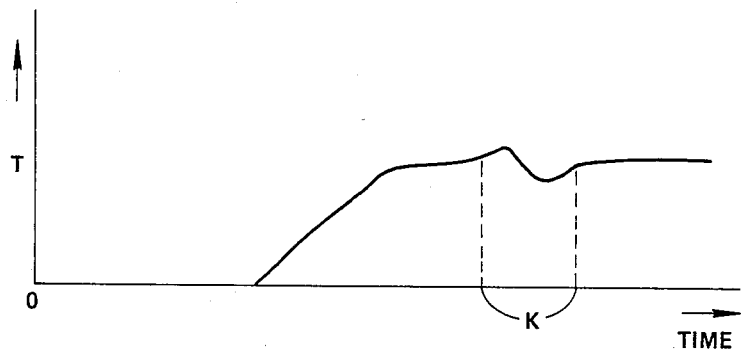
FIG. 7 shows the variation of output shaft torque T against time which is caused by the characteristic shown in FIG. 6.

As will be understood from FIGS. 2 and 3, the dynamic frictional coefficient μ(mu) increases as the relative rotational speed V approaches to zero immediately before the select operation is completed at the instant $t_e$. This increase of the dynamic frictional coefficient μ(mu) causes the generation of a great peak of the torque immediately before the completion of the select operation. As will be understood from the above equation (1), the torque T may be suppressed if the servo actuating fluid pressure P is decreased to offset the increase of the dynamic frictional coefficient μ(mu). In order to suppress this peak of the torque, therefore, the servo actuating fluid pressure P has been decreased momentarily as shown in FIG. 6 under the control of the control unit 80. As a result, the peak of the torque which otherwise would take place at a stage as indicated by the reference character K has been suppressed as shown in FIG. 7. The size of the restricted inlet 70, the predetermined time $t_d$ and the pulse width $t_0$ are selected such that the servo actuating fluid pressure P is temporarily decreased before the torque creates the peak immediately before the completion of the select operation. According to this embodiment, the variation of relative rotational speed V with respect to time may be modified to a desired characteristic only by appropriately selecting the size of the restricted inlet 70, the predetermined time $t_d$ and the predetermined pulse width $t_0$. Thus, even if the rise time of the servo actuating fluid pressure P is decreased to shorten the rise time of the torque T, the peak to be generated immediately before the completion of the select operation can be suppressed. This can be done by decreasing the drop of the relative rotational speed V against time at the stage prior to the completion of the select operation. As a result, a quick select operation is provided.

Figure 8:
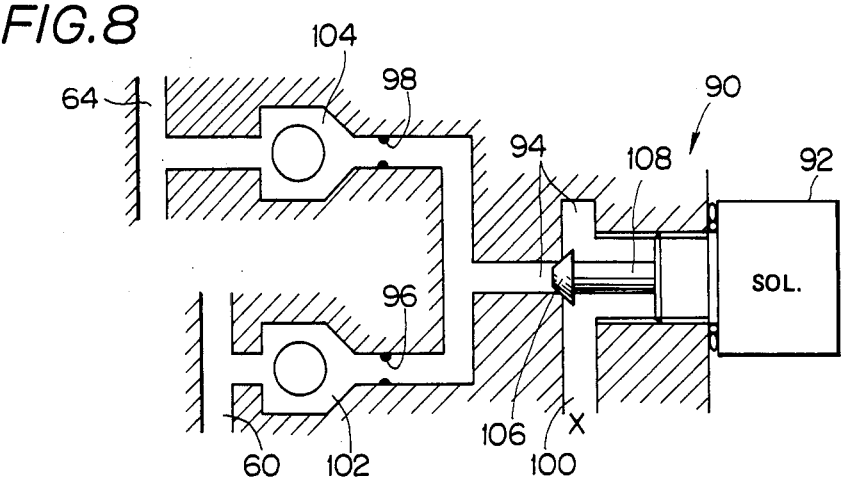
FIG. 8 illustrates schematically an electrically operated valve of a second embodiment of a control system according to the present invention.

Second embodiment is described hereinafter along with FIG. 8.

The second embodiment is different from the previously described first embodiment in that not only the servo actuating fluid pressure passing through a fluid line 60, but also a servo actuating fluid pressure passing through a fluid line 64 are modulated by an electrically operated valve 90 which has a single solenoid 92. Similarly to the counterpart shown in FIG. 4, the electrically operated valve 90 includes a control chamber 94. The control chamber 94, however, includes a first restricted inlet 96, a second restricted inlet 98, and an exhaust 100. The first restricted inlet 96 communicates with the fluid line 60 via a first one-way check valve 102 and the second restricted inlet 98 communicates with the fluid line 64 via a second one-way check valve 104 such that the fluid communication between the fluid lines 60 and 64 via the control chamber 94 is prevented. The communication between the first and second restricted inlets 96, 98 and the exhaust 100 is controlled by a valve 106. The valve 106 has an armature 108 attached thereto and thus is either in an open or closed position with respect to the first and second restricted inlets 96, 98 as determined by energization of the solenoid 92. When the solenoid 92 is energized, the armature 108 is attracted to the right and, accordingly, the valve 106 so that communication is permitted between the first and second restricted inlets 96 and 98 and the exhaust 100. This results in a drop in the pressure of the fluid, i.e., the servo actuating fluid pressure, supplied to the forward clutch 42 through the fluid line 60, or a drop in the pressure of the fluid supplied to the high and reverse clutch 48 and to the low-reverse band brake 50. When the solenoid 92 is deenergized, the attractive force acting on the armature 108 is removed and the valve 106 due to bias of a return spring built in the solenoid 92 will return to the normal closed position illustrated in FIG. 8.

The solenoid 92 is supplied with current from a control unit 80. The operation of this second embodiment is hereinafter described along with FIG. 8 and FIG. 4 as well.

In operation, if a manual valve 56 is shifted from the N range to the D range, the fluid under pressure begins to pass through the fluid line 60 to the forward clutch 42. Thus, the pressure of the fluid supplied to the forward clutch 42, i.e., the servo actuating fluid pressure, rises. There takes place a voltage drop at a predetermined terminal of an inhibitor switch, i.e., a D range select signal, when the manual valve 56 is shifted to the D range from the N range. The control unit 80 is triggered by this voltage drop and generates a pulse signal with a predetermined voltage and a first predetermined width after a first predetermined time $t_{d1}$ has elapsed since the instant when the above mentioned voltage drop occurred. Upon receiving this pulse signal, the solenoid 92 is energized to attract the armature 108 to the right and accordingly the valve 106 to the open position. Thus, the communication between the first restricted inlet 96 and the exhaust 100 is permitted for the predetermined time corresponding to the pulse width, thus causing a temporal drop in the servo actuating fluid pressure applied to the forward clutch 42. The communication between the second restricted inlet 98 and the exhaust 100 is also permitted in this case, but this does not cause any problem because the fluid is drained from the fluid line 64.

If, on the other hand, the manual valve 56 is shifted from the N range to the R range, the fluid under pressure begins to pass through the fluid line 64 to the high and reverse clutch 48 and to the low-reverse brake 50 through the branch line 66. Thus, the pressure of the fluid supplied to the high and reverse clutch 48 and to the low-reverse brake 50, i.e., the servo actuating fluid pressure, rises. There takes place a predetermined voltage rise at another predetermined terminal of the inhibitor switch, i.e., a R range select signal, when the manual valve 56 is shifted to the R range from the N range. The control unit 80 is triggered by this voltage rise and generates a pulse signal with a predetermined voltage and a second predetermined width after a second predetermined time $t_{d2}$ has elapsed since the instant when the above mentioned voltage rise occurred. Upon receiving this pulse signal, the solenoid 92 is energized to attract the armature 108 to the right and accordingly the valve 106 to the open position. Thus, the communication between the second restricted inlet 98 and the exhaust 100 is permitted for the predetermined time corresponding to the pulse width, thus causing a temporal drop in the servo actuating fluid pressure applied to the high and reverse clutch 48 and to the low-reverse brake 50. The communication between the first restricted inlet 96 and the exhaust 100 is also permitted in this case, but this does not cause any problem because the fluid is drained from the fluid line 60.

Third embodiment is described hereinafter along with FIG. 9.

This third embodiment is substantially the same as the first embodiment shown in FIG. 4 except the provision of a feature that a control unit 80 supplies current to a solenoid 78 only when an engine 24 is idling. Thus, temporal drop in servo actuating fluid pressure upon selecting a D range will not take place or terminate if a driver steps on an accelerator pedal to keep engine speed higher than the idling speed. In this case, the engine racing due to the temporal drop in the servo actuating fluid pressure will be prevented.

Figure 9:
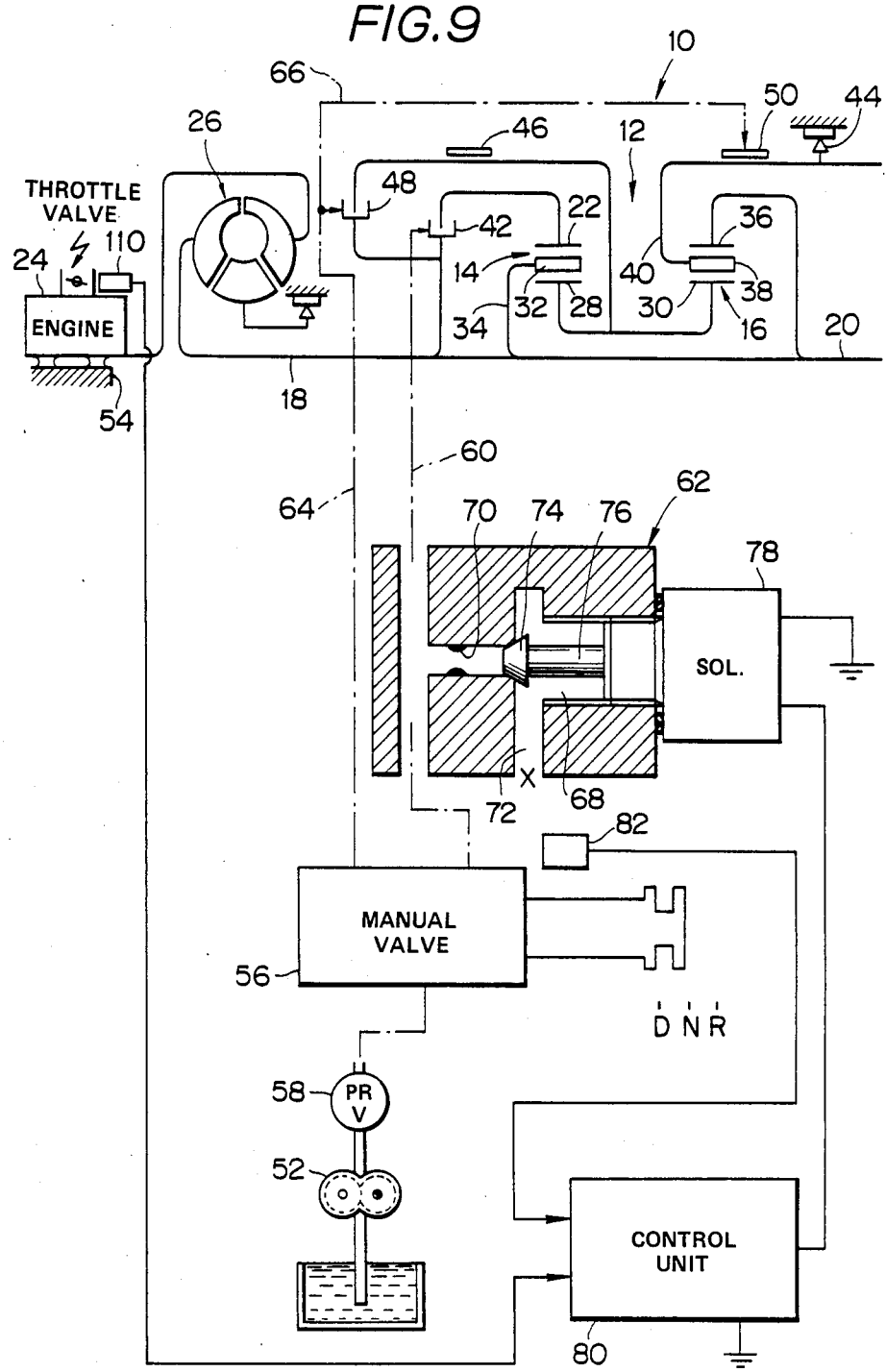
FIG. 9 illustrates schematically a third embodiment of a control system according to the present invention.

Referring to FIG. 9, in order to detect the idle state operation of the engine 24, a throttle sensor 110 is provided which generates an idling operation indicative signal when the throttle valve of the engine 24 is in the idle speed position. This signal is supplied to the control unit 80. Upon receiving no idling operation indicative signal, the control unit 80 ceases its operation and will stop supplying electric current to the solenoid 78.

Figure 10:
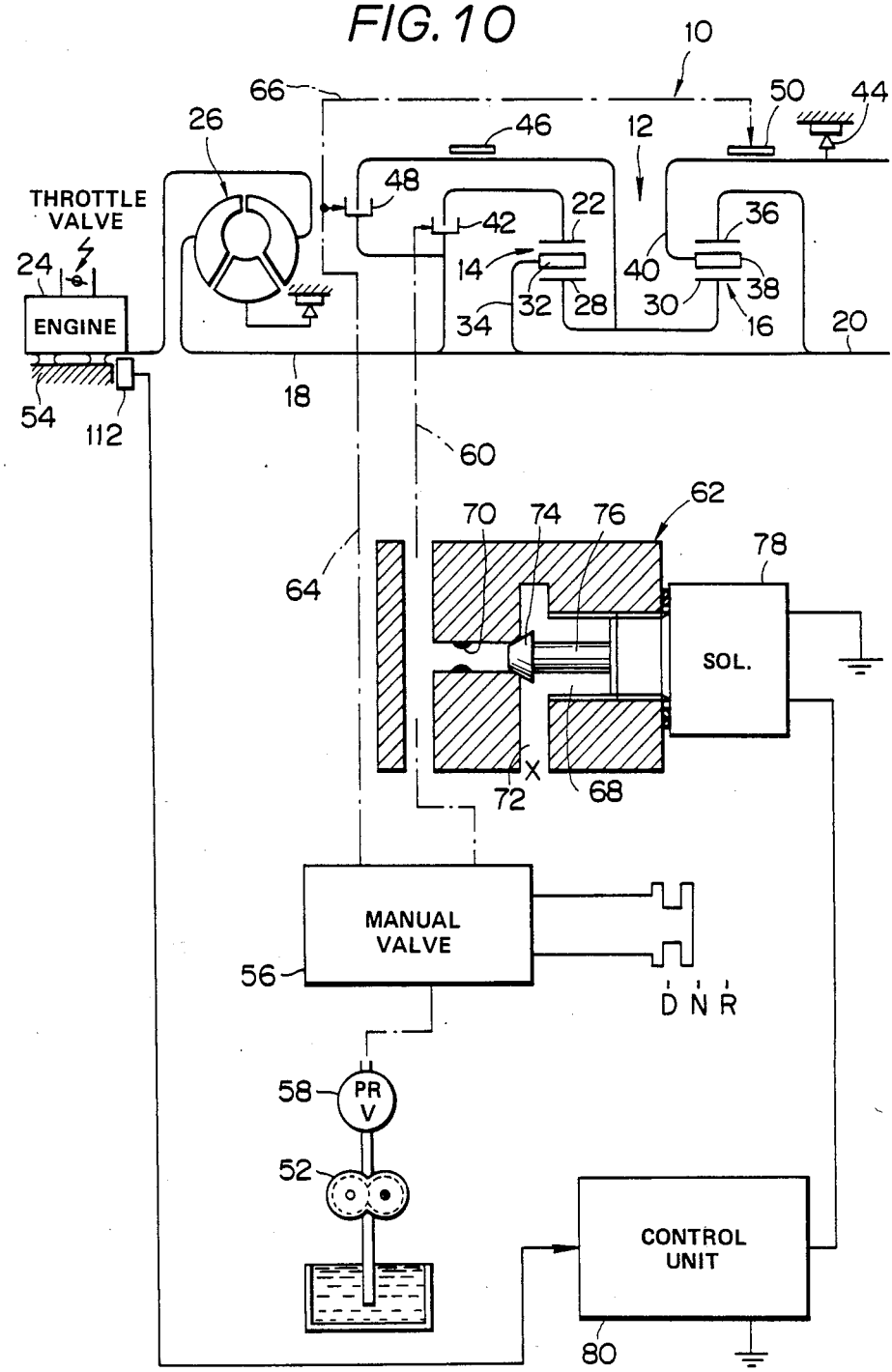
FIG. 10 illustrates schematically a fourth embodiment of a control system according to the present invention.

Fourth embodiment is described hereinafter along with FIGS. 10, 11 and 12.

This fourth embodiment is substantially the same as the first embodiment shown in FIG. 4 except the provision of a feature that a control unit 80 is controlled by a roll sensor 112 which detects the occurrence of a rolling movement of an engine 24. This fourth embodiment is designed to provide a closed loop system whereby a problem inherent with an open loop control employed by the first embodiment is solved.

The problem is that the rise time of the torque transmitted by a friction element to be engaged after a manual valve has been shifted to select a D range or a R range is dependent on the amount of hydraulic fluid remaining in a fluid line leading to this friction element. Considering the amount of hydraulic fluid remaining in the fluid line, the amount of residual fluid decreases as time passes after the manual valve has been shifted from the D or R range to the N range. Thus, the rise time of the torque becomes long if the manual valve stays in the N position for a long time as compared to the case where the manual valve is shifted to the D range after a temporal stay in the N range after it was shifted to the N range from the D range. Thus, there is a variation in the rise time of the torque and thus the timing of a stage where the torque shows the substantial peak varies, accordingly. It has been recognized that if the friction element to be engaged on start-up of the vehicle begins to be engaged, a transmission output shaft increases, and a reaction created against this torque increase acts on the engine to cause same to roll about its axis. If the engine is transversely mounted with respect to the vehicle's longitudinal direction, the engine tends to roll substantially because the direction of this rolling movement of the engine is the same as the direction of acceleration which the vehicle is subject to upon start-up. Thus, the roll sensor 112 is so designed as to generate an output Sr when the amount of the rolling movement of the engine 24 exceeds a predetermined reference value. Upon receiving this output Sr of the roll sensor 112, the control unit 80 generates a pulse signal Sa with a predetermined voltage and a predetermined width $t_p$ after a predetermined time $t_{d3}$ has elapsed since the output Sr rose. Upon receiving this pulse signal Sa, the solenoid 78 is energized to attract an armature 76 to the right and accordingly a valve 74 to the open position similarly to the first embodiment described in connection with FIG. 4. As a result, a servo actuating hydraulic fluid pressure P is momentarily decreased as shown in FIG. 12 at the appropriate timing always regardless of the time where the manual valve 56 has been placed at the N range.

Figure 11:
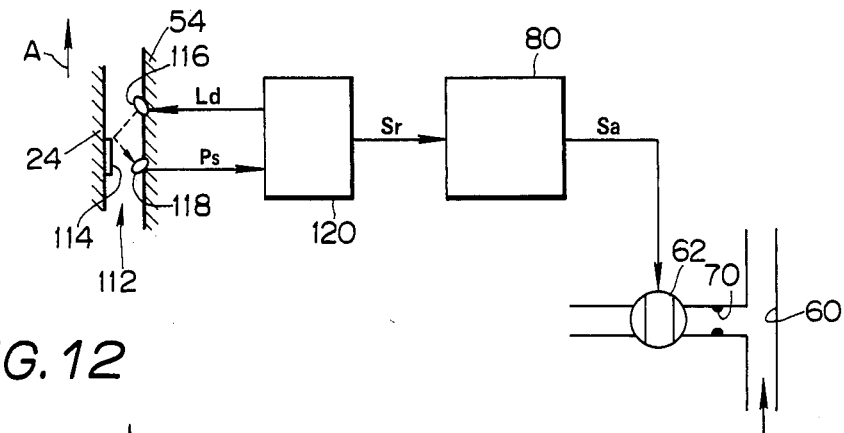
FIG. 11 is a schematic illustration of a roll sensor used in the control system shown in FIG. 10.
Figure 12:
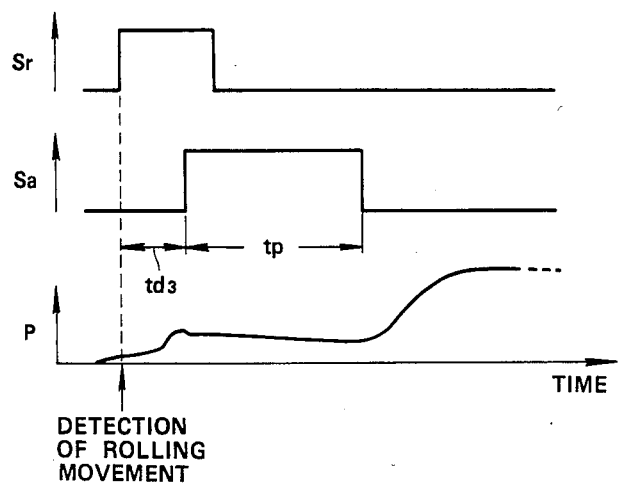
FIG. 12 is a timing diagram showing a sensor output signal Sr, a solenoid drive signal Sa and the variation of servo actuating fluid pressure P against time.

Referring to FIG. 11, the structure of the roll sensor 112 is hereinafter described. The reference numeral 54 designates a vehicle body on which the engine 24 is supported by elastic mounts, not shown, in the conventional manner. A reflecting plate 114 is securely attached to the outer surface of the engine 24. A light emitter 116 and a light receiver 118 are disposed on the vehicle body 54. The arrangement of the reflecting plate 114 with respect to the light emitter 116 and light receiver 118 is such that normally light emitted by the light emitter 116 does not impinge on the reflecting plate 114 and accordingly the light receiver does not receive any light, but if the engine 24 rolls to cause the reflecting plate 114 to displace beyond a predetermined amount in a rolling direction as indicated by an arrow A, the light emitted by the light emitter 116 will impinge on the reflecting plate 114 and the reflected light will be received by the light receiver 118. The light emitter 116 employs a light emitting diode (LED), while the light receiver 118 employs a phototransistor or a photodiode.

The light emitter 116 keeps on emitting light on power Ld supplied thereto by a detector 120 which incoporates a power source. The light receiver 118 supplies a photo detecting signal Ps to the detector 120. The detector 120 includes a waveform shaping circuit where the signal Ps is converted into the pulse signal Sr which is mentioned before.

Figure 13:
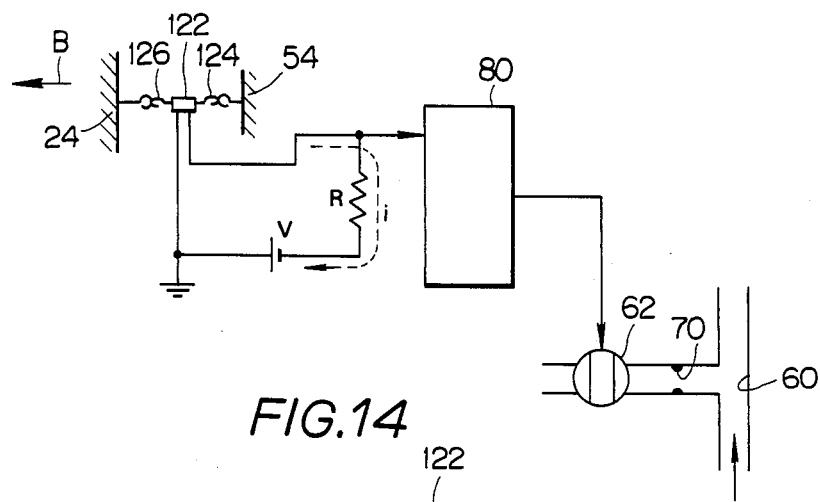
FIG. 13 is a schematic illustration of a roll sensor which may be used in the control system shown in FIG. 10.
Figure 14:
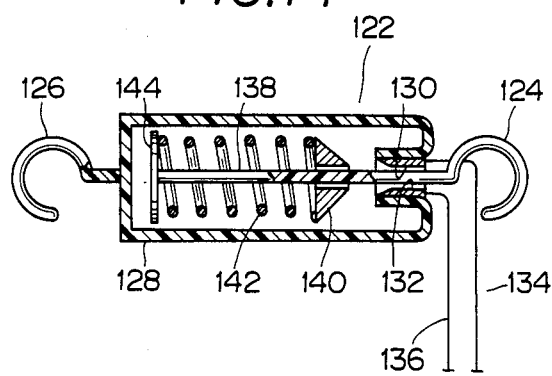
FIG. 14 is a sectional view illustrating the structure of the sensor shown in FIG. 13.
Figure 15:
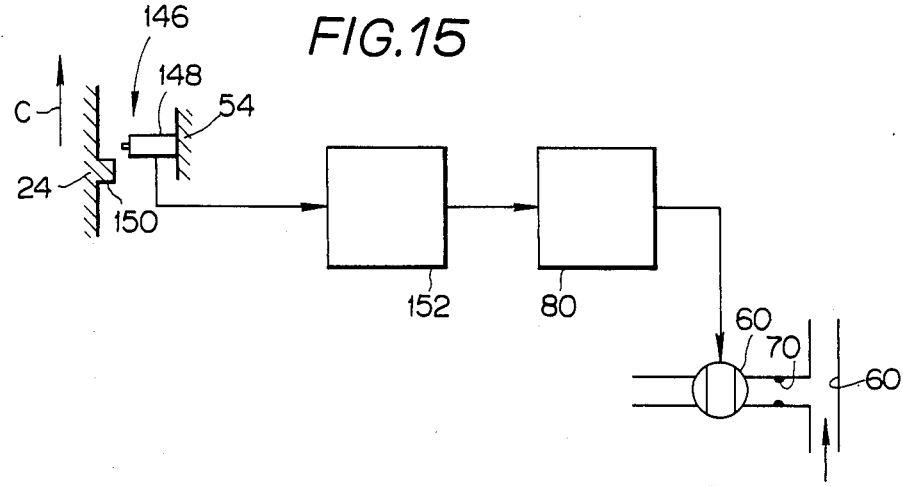
FIG. 15 is a schematic illustration of a roll sensor which may be used in the control system shown in FIG. 10.

Alternatively, the roll sensor may take the structure shown in FIGS. 13 and 14 or the structure shown in FIG. 15.

Referring to FIG. 13, the roll sensor now generally denoted by the reference numeral 122 is in the form of a mechanical displacement switch designed to be closed when an engine 24 has displaced beyond a predetermined amount relative to a vehicle body 54 in an engine rolling direction as indicated by an arrow B. The mechanical displacement switch has a first hook 124 coupled with the vehicle body 54 and a second hook 126 coupled with the engine 24.

Referring particularly to FIG. 14, the second hook 126 is formed integral with a cylindrical casing 128. The cylindrical casing 128 has a closed end from which the second hook 126 extends and an open end curled inwardly to form a contact carrier on which two stationary contacts 130 and 132 are securely supported. The contacts 130 and 132 are connected to leads 134 and 136, respectively, and they are electrically insulated from each other. The first hook 124 has attached thereto a plunger 138 of insulating material. The plunger 138 extends through the contact carrier into the bore of the casing 128. A movable contact 140 adapted to bridge the stationary contacts 130 and 132 is slidably mounted to the plunger 138. The movable contact 140 is normally held in a spaced relationship from the stationary contacts 132 and 134 as illustrated by means of a spring 142. The spring 142 has one end anchored to a spring retainer 144 and an opposite end anchored to the movable contact 140. The leads 134 and 136 are circuited with a resistor R and a power source V as shown in FIG. 13.

In operation, if the engine 24 is displaced in a rolling direction as indicated by an arrow B beyond a predetermined amount, this displacement relative to the vehicle body 54 causes the movable contact 140 to come into contact with the stationary contacts 130 and 132. Further displacement is permitted by compression of the spring 142. When the stationary contacts 130 and 132 are bridged by the movable contact 140, there takes place a voltage rise at a side of the resistor R remote from the power source V. This voltage rise is supplied to a control unit 80 as a roll indicative signal.

Referring to FIG. 15, another structure of a roll sensor is hereinafter described. This roll sensor now denoted generally by the reference numeral 146 is in the form of a high frequency contactless switch. The high frequency contactless switch 146 includes a pickup 148 securely attached to a vehicle body 54, a projection 150 to be detected, and a detector 152. The projection 150 is securely attached relative to an engine 24. The arrangement is such that the detector 152 generates an output as a roll indicative signal when the engine 24 is displaced in a rolling direction as indicated by an arrow C beyond a predetermined amount. This output is supplied to a control unit 80.

Fifth embodiment is described hereinafter along with FIG. 16.

Figure 16:
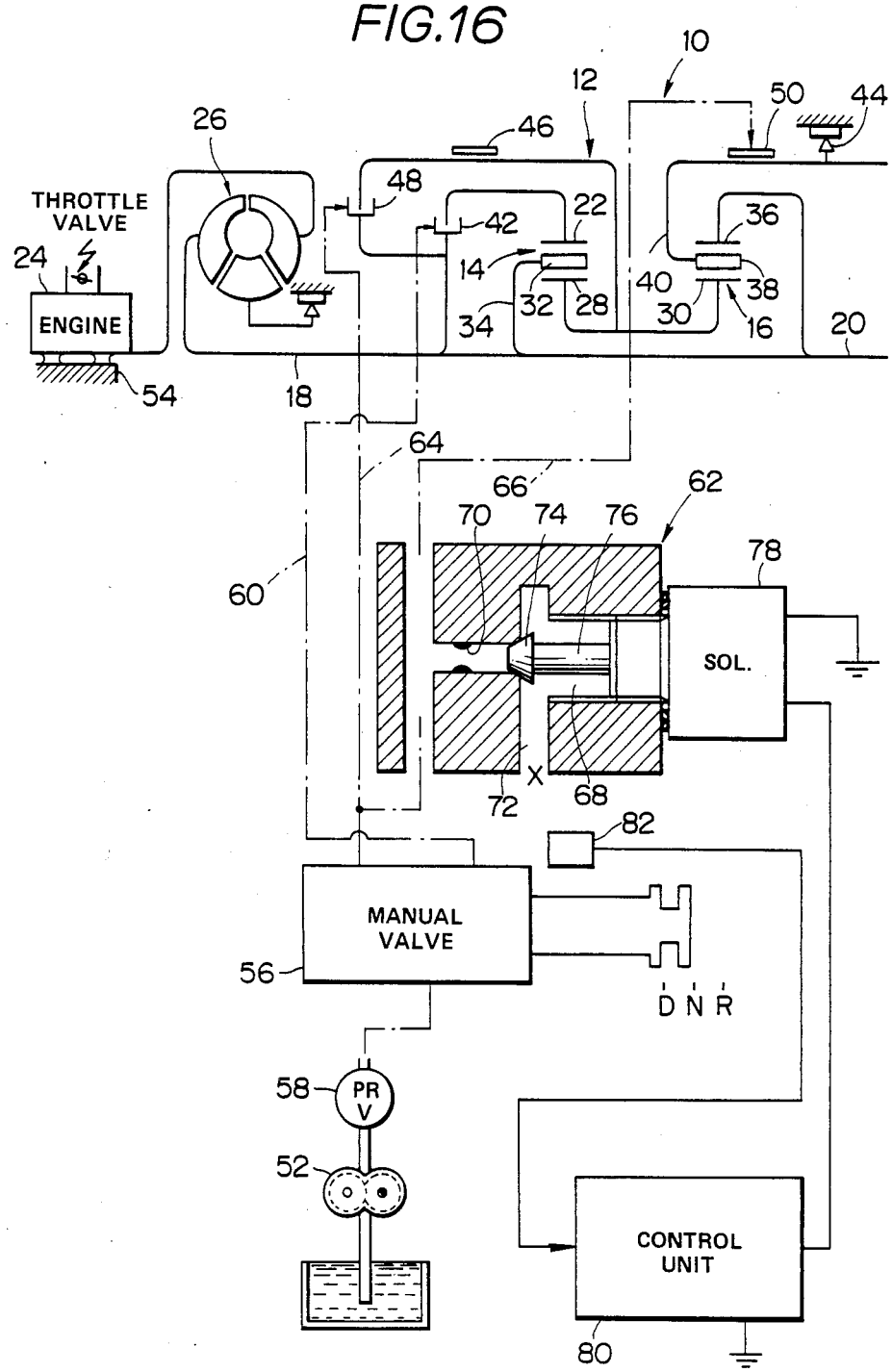
FIG. 16 illustrates schematically a fifth embodiment of a control system according to the present invention.

This fifth embodiment is substantially the same as the first embodiment shown in FIG. 4, but different from the latter in that in the embodiment shown in FIG. 16, it is contemplated to reduce a select shock occurring when a manual valve is shifted to a R range from a N range, whereas in the first embodiment it is contemplated to reduce a select shock occuring when the manual valve is shifted to a D range from the N range.

In the case of the automatic transmission shown in FIG. 16, if the manual valve 56 is shifted to the R range from the N range, the fluid under pressure begins to pass through a fluid line 64 to a high and reverse clutch 48 and through a branch line 66 to a low-reverse band brake 50. In order to establish a reverse gear ratio, if the reverse gear ratio is assumed to be 2.5, the low-reverse brake 50 will have to hold the carrier 40 stationary with a torque about 3.5 times as much as a torque carried by a transmission input shaft 18 which the high and reverse clutch 48 is to connect to sun gears 28, 30. Due to space limitation, all of the friction elements including the above mentioned high and reverse clutch 48 and low-reverse band brake 50 cannot have torque transmission capacities different enough to meet specific demands. For example, if the torque transmission capacity of a certain friction element is assumed to be 1, the other friction elements have torque transmission capacities ranging from 1.5 times to 2.0 times as much as that of the certain friction element. Turning back to the establishment of the reverse gear ratio, the servo actuating fluid pressure has to be high enough to meet the demand imposed on the low-reverse band brake 50, but this servo actuating fluid pressure is too high in view of the demand imposed on the high and reverse clutch 48. This means that the high and reverse clutch 48 has the torque transmission capacity sufficiently larger than necessary during operation with the reverse gear ratio. Therefore, after the manual valve 56 has been shifted to the R range from the N range, the high and reverse clutch 48 is engaged completely before the low-reverse band brake 50 is engaged so that the low-reverse brake continues to slip until the select operation is completed and thus the torque beared by the low-reverse brake 50 will determine the output torque of a transmission output shaft 20. For this reason, an electrically operated valve 62 is arranged to control the servo actuating fluid pressure passing through the branch fluid line 66 as shown in FIG. 16. The electrically operated valve 62 is operated in substantially similar manner as the counterpart of the first embodiment except that the control unit 80 shown in FIG. 16 which is controlled by a range position sensor 82 supplies electric current to a solenoid 78 of the electrically operated valve 62 after the manual valve 56 has been shifted to the R range from the N range.

Figure 17:
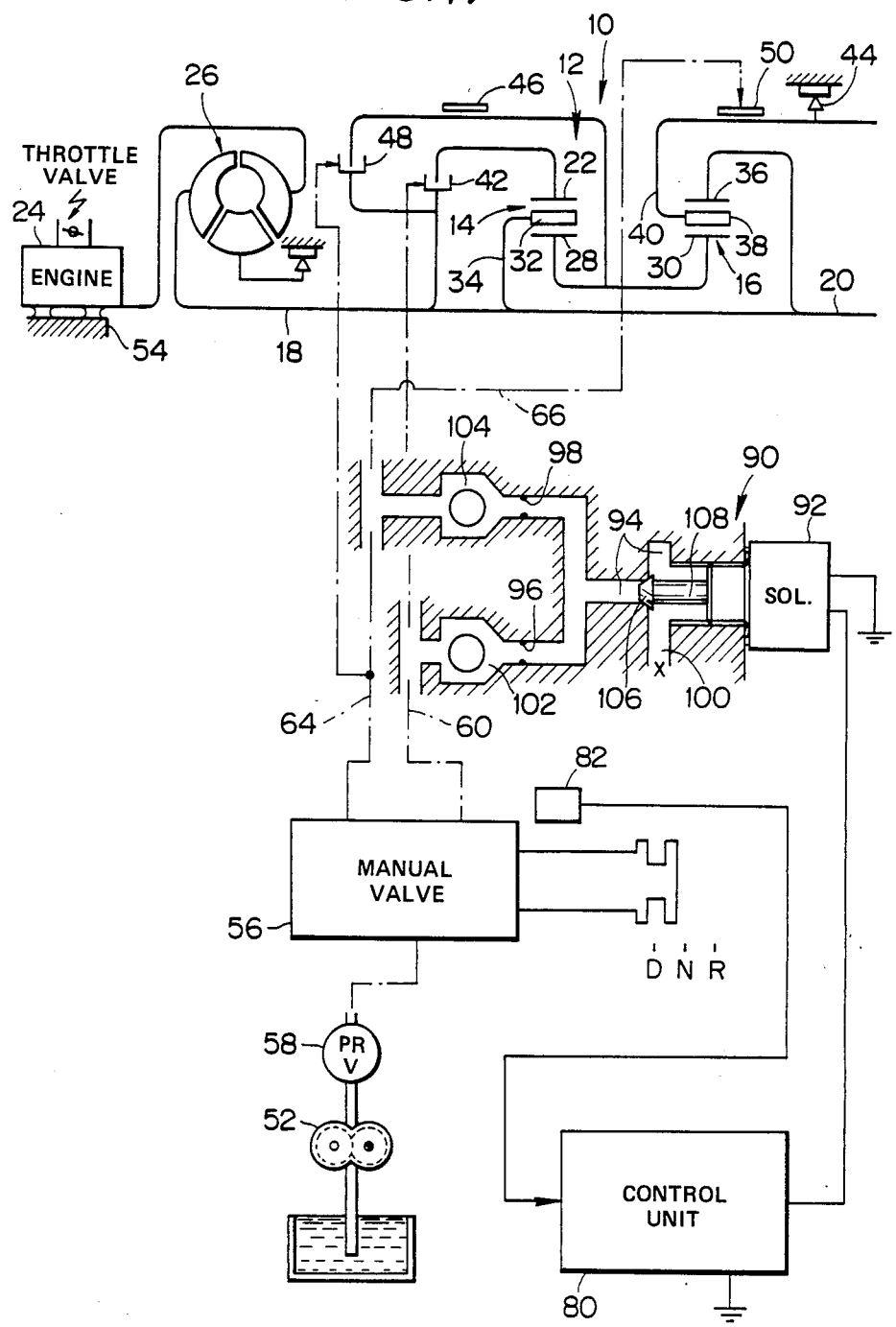
FIG. 17 illustrates schematically a sixth embodiment of a control system according to the present invention.

Sixth embodiment is described hereinafter along with FIG. 17.

This sixth embodiment is substantially the same as the second embodiment described in connection with FIG. 8 except that a second restricted inlet 98 of an electrically operated valve 90 communicates with a branch fluid line 66 via a second one-way check valve 104 as different from the second embodiment where the second restricted inlet 98 communicates with the fluid line 64. In this embodiment, for the same reason as mentioned above in connection with the fifth embosdiment shown in FIG. 16, the servo actuating fluid pressure passing through the branch line 66 is modulated by the electrically operated valve 90.

From the description of the fifth and sixth embodiments, it will be understood that if two friction elements are to be engaged to produce a certain gear ratio, the variation of transmission output shaft torque during the transision is determined by one of the friction elements which has less reserve in torque transmission capacity than the other, and thus the peak of the transmission output shaft torque can be suppressed by modulating the servo actuating fluid pressure supplied to this one friction element having the less reserve in the torque transmission capacity.

What is claimed is:

1. A control system for an automatic transmission for a vehicle having mounted therein an engine, the transmission having a plurality of friction elements, comprising:

a source providing hydraulic fluid;
    means for regulating said hydraulic fluid and generating a regulated fluid pressure;
    a manual valve communicating with said regulated fluid pressure generating means;
    means for defining a fluid line leading from said manual valve toward the plurality of friction elements;
    said manual valve being manually operable to perform a predetermined select operation and allow said regulated fluid pressure to be transmitted via said fluid line toward the plurality of friction elements after said manual valve has performed said predetermined select operation;
    means responsive to said predetermined select operation for generating a trigger signal;
    means for generating an output signal for a first predetermined period of time upon elapse of a second predetermined period of time after said trigger signal has been generated; and
    valve means communicating with said fluid line and operative in response to said output signal to discharge hydraulic fluid from said fluid line.

2. A control system as claimed in claim 1, wherein said trigger signal generating means includes sensor means for generating a sensor output in response to said predetermined select operation by said manual valve.

3. A control system as claimed in claim 2, wherein said valve includes a control chamber having a restricted inlet communicating with said fluid line, an exhaust and a valve disposed to control communication between said restricted inlet and said exhaust, and said fluid line leads from said manual valve to one of the friction elements.

4. A control system as claimed in claim 3, wherein said one friction element is a forward clutch that is to be engaged when said manual valve performs said predetermined select operation.

5. A control system for an automatic transmission for a vehicle having mounted therein an engine, the transmission having a plurality of friction elements, comprising:
    means for generating a regulated fluid pressure;
    means for generating a trigger signal;
    means for generating an output signal for a first predetermined period of time upon elapse of a second predetermined period of time after said trigger signal has been generated;
    a valve communicating with said regulated fluid pressure generating means and operative in response to said output signal to modulate said regulated fluid pressure to provide a servo actuating fluid pressure applied to said plurality of friction elements.
    said trigger signal generating means includes a manual valve fluidly disposed between said regulated fluid pressure generating means and said valve, and sensor means for generating a sensor output in response to a predetermined select operation by said manual valve;
    wherein said valve includes a control chamber having a first restricted inlet, a second restricted inlet, an exhaust and a valve disposed to control communication between said first and second restricted inlets and said exhaust, said first restricted inlet communicating via a first one-way check valve with a first fluid line leading from said manual valve to one of the friction elements, said second restricted inlet communicating via a second one-way check valve with a second fluid line leading from said manual valve to another of the friction elements.

6. A control system for an automatic transmission for a vehicle having mounted therein an engine, the transmission having a plurality of friction elements, comprising:
    means for generating a regulated fluid pressure;
    means for generating a trigger signal;
    means for generating an output signal for a first predetermined period of time upon elapse of a second predetermined period of time after said trigger signal has been generated;
    a valve communicating with said regulated fluid pressure generating means and operative in response to said output signal to modulate said regulated fluid pressure to provide a servo actuating fluid pressure applied to said plurality of friction;
    said trigger signal generating means includes a manual valve fluidly disposed between said regulated fluid pressure generating means and said valve, and sensor means for generating a sensor output in response to a predetermined select operation by said manual valve; and
    means for generating an idling operation indicative signal when the engine is idling, and said valve being operative in response also to said idling operation indicative signal such that when said idling operation indicative signal is absent, said servo actuating fluid pressure stays as high as said regulated fluid pressure generated by said regulated fluid pressure generating means.

7. A control system for an automatic transmission for a vehicle having mounted therein an engine, the transmission having a plurality of friction elements, comprising:
    means for generating a regulated fluid pressure;
    means for generating a trigger signal;
    means for generating an output signal for a first predetermined period of time upon elapse of a second predetermined period of time after said trigger signal has been generated;
    a valve communicating with said regulated fluid pressure generating means and operative in response to said output signal to modulate said regulated fluid pressure to provide a servo actuating fluid pressure applied to said plurality of friction elements;
    wherein said trigger signal generating means includes sensor means for generating a rolling movement indicative signal when the engine rolls beyond a predetermined amount, said rolling movement indicative signal being supplied as said trigger signal to said output signal generating means.

8. A control system as claimed in claim 7, wherein said sensor means includes a reflecting plate securely attached to the engine, a light emitter and a light receiver, said light emitter and said light receiver being disposed on the vehicle body.

9. A control system as claimed in claim 7, wherein said sensor means is in the form of a mechanical displacement switch.

10. A control system as claimed in claim 7, wherein said sensor means is in the form of a high frequency contactless switch.

11. A control system as claimed in claim 3, wherein said one friction element is a low-reverse brake that is to be applied when the manual valve performs said predetermined select operation.

12. A control system as claimed in claim 11, wherein said low-reverse brake is applied in cooperation with engagement of a high and reverse clutch to establish a reverse range in the automatic transmission as a result of said predetermined select operation performed by said manual valve.

13. A control system as claimed in claim 3, wherein said control chamber further has a second restricted inlet, said second restricted inlet communicating with a second fluid line leading from said manual valve to another one of the friction elements, said another one of the friction elements being a forward clutch that is to be engaged when the manual valve performs another predetermined select operation.

14. A control system for an automatic transmission for a vehicle having mounted therein an engine, the transmission establishing a drive range when a forward clutch is engaged, while establishing a reverse range when a high and reverse clutch is engaged and a low-reverse brake is applied, the control system comprising:
    a source providing hydraulic fluid source;
    means for regulating said hydraulic fluid and generating a regulated fluid pressure;
    a manual valve communicating with said regulated fluid pressure generating means, said manual valve being manually operative to perform a first predetermined select operation to cause the transmission to establish the forward drive range and a second predetermined select operation to cause the transmission to establish the reverse drive range;
    means for generating a sensor output indicative of the occurrence of said first predetermined select operation and said second predetermined select operation;

means for generating a solenoid drive signal for a first predetermined period of time upon elapse of a second predetermined period of time after said sensor output indicates the occurrence of said second predetermined select operation by said manual valve;

means for defining a fluid line leading from said manual valve to the flow-reverse brake to transmit said regulated fluid pressure thereto;

an electrically-operated valve communicating with said fluid line and operative in response to said solenoid drive signal to discharge hydraulic fluid from said fluid line to suppress a rise in hydraulic fluid pressure in said fluid line for said first predetermined period of time.

15. A control system for an automatic transmission for a vehicle having mounted therein an engine, the transmission establishing a predetermined speed ratio when a first hydraulically operated friction element and a second hydraulically operated friction element are engaged, wherein said second friction element has less reserve in torque transmission capacity than said first friction element does during transition until establishment of the predetermined speed ratio, the control system comprising:

a source providing hydraulic fluid pressure;

means for regulating said hydraulic fluid and generating a regulated fluid pressure;

a manual valve communicating with said regulated fluid pressure generating means, said manual valve being manually operative to perform a predetermined select operation to cause the transmission to establish the predetermined speed ratio;

means for generating a sensor output indicative of the occurrence of said predetermined select operation;

means for generating a solenoid drive signal for a first predetermined period of time upon elapse of a second predetermined period of time after said sensor output indicates the occurrence of said predetermined select operation by said manual valve;

means for defining a fluid line leading from said manual valve to the second friction element to transmit said regulated fluid pressure thereto;

an electrically-operated valve communicating with said fluid line and operative in response to said solenoid drive signal to discharge hydraulic fluid from said fluid line to suppress a rise in hydraulic fluid pressure in said fluid line for said predetermined period of time.

* * * * *